United States Patent
Kawase et al.

(10) Patent No.: US 6,630,522 B2
(45) Date of Patent: Oct. 7, 2003

(54) FLOW-AND-LEVELING AGENTS FOR PAINTS AND LINKS

(75) Inventors: Masafumi Kawase, Koshigaya (JP); Shigehiro Kawahito, Soka (JP)

(73) Assignee: Kusumoto Chemicals Ltd., Tokyo (JP)

( * ) Notice: Subject to any disclaimer, the term of this patent is extended or adjusted under 35 U.S.C. 154(b) by 0 days.

(21) Appl. No.: 09/983,114

(22) Filed: Oct. 23, 2001

(65) Prior Publication Data

US 2003/0022984 A1 Jan. 30, 2003

(30) Foreign Application Priority Data

Feb. 16, 2001 (JP) ........................................ 2001-040288

(51) Int. Cl.[7] .................. C09D 11/00; C08F 30/08; C08F 230/08; C07D 5/00
(52) U.S. Cl. ................ 523/161; 106/31.13; 106/287.1; 106/287.15; 526/279; 526/319; 526/320; 528/25; 528/26; 528/32; 528/33
(58) Field of Search ................................. 526/279, 319, 526/320; 528/25, 26, 32, 33; 523/161; 106/31.13, 287.1, 287.15

(56) References Cited

U.S. PATENT DOCUMENTS

| | | | | |
|---|---|---|---|---|
| RE31,406 E | * | 10/1983 | Gaylord | 526/279 |
| 4,981,903 A | * | 1/1991 | Garbe et al. | 524/547 |
| 5,177,167 A | * | 1/1993 | Tone et al. | 526/279 |
| 5,773,153 A | * | 6/1998 | Shiokawa et al. | 428/447 |
| 5,998,501 A | * | 12/1999 | Tsutsumi et al. | 523/160 |
| 6,090,902 A | * | 7/2000 | Kuo et al. | 526/279 |
| 6,399,081 B1 | * | 6/2002 | Nakanishi et al. | 424/401 |

OTHER PUBLICATIONS

Excerpt from Chisso Corporation Catalog, from Chisso website.*

* cited by examiner

Primary Examiner—Robert Dawson
Assistant Examiner—Jeffrey B. Robertson
(74) Attorney, Agent, or Firm—Sherman & Shalloway

(57) ABSTRACT

Additives for paints and inks which are suitable to be blended in paints and inks for high quality finishing are provided. The additive is characterized by comprising a copolymer having a number-average molecular weight of from 1,000 to 60,000 which is obtained by copolymerizing 2–50% by weight of reactive monomer containing in its molecule polydimethylsiloxane having a degree of polymerization of 5 to 100 with 98–50% by weight of reactive monomers which have been heretofore used as flow-and-leveling agents for paints and inks. When minor amounts of those additives are incorporated in paints or inks, drawbacks on painted or printed planes caused by environmental staining substances are prevented and the appearance of the painted or printed objects is improved.

5 Claims, No Drawings

FLOW-AND-LEVELING AGENTS FOR PAINTS AND LINKS

DETAILED DESCRIPTION OF THE INVENTION

1. Technical Field to Which the Invention Belongs

This invention relates to flow-and-leveling agents for paints and inks, which, when added to paints and inks in minor amounts, can impart to the paints and inks flow-and-leveling property in the occasions of their application or printing and at the same time can prevent occurrence of coating or printing defects even in the presence of foreign matters which are a cause of ruptures in coating or printing step.

2. Prior Art

Paints which are applied by industrial line operation, such as those high quality paints for automotives, precoat metal (PCM) paints and paints for household appliances, are required to exhibit not only anti-corrosion property but also high quality finish excelling in appearance. It is, therefore, essential that the finished surfaces are free from cissing, cratering, fish-eyes, clouds and the like and are level and smooth. As paint additives for imparting such functions, surface control agents such as flow-and-leveling agents, defoamers, anti-popping agents, brighteners and anti-rupture agents are used.

Conventionally, atomizing coating such as air spray or high-speed continuous coating using roll coater or the like have been practiced in line coating. According to these coating methods, mist of the lubricants used on compressors, roll coater machines and the like or mist of the used paints may deposit on the surfaces of the objects being painted and cause occurrence of ruptures. Besides this problem, in coating lines wherein coating and sanding are repeated plural times as in the case of coating automobile bodies, ruptures caused by dust formed during sanding with sand paper or soiling with operators' hands can create a problem. (These matters which can cause ruptures are hereafter collectively referred to as "foreign dust").

As a means to solve this problem of ruptures at the coating time, heretofore modified silicone oils or vinyl ether polymers have been used as additives. For example, Japanese Patent Publication Hei 1 (1989)-234478B1 taught the usefulness of vinyl ether polymers having $C_2$–$C_4$ alkyl groups as anti-rupture agent.

THE PROBLEM TO BE SOLVED BY THE INVENTION

Recently high-solid paints for environmental preservation or paints free of melamine resin curing agents to cope with acid precipitation are commercialized. When modified silicone oils or vinyl ether polymers are added to those recently marketed paints, however, they tend to adversely affect re-coating property of those paints (i.e., interlayer-adherability of over-painted layers is impaired or color tone of top coating is changed).

Accordingly, therefore, the object of the present invention is to provide flow-and-leveling agents which prevent ruptures caused by foreign dust and give smooth and level painted surfaces, without interfering with the paints' recoating property.

MEANS FOR SOLVING THE PROBLEM

As a result of various studies, we have come to discover that the above object of the invention is accomplished by blending a flow-and-leveling agent comprising a copolymer having a number-average molecular weight of 1,000–60,000, preferably 2,000–30,000 with paints, said copolymer being formed by copolymerizing 2–50% by weight, preferably 5–35% by weight of silicone oil containing an acryloyloxy group or methacryloyloxy group, as monomer (A) which is expressed by the following general formula (I):

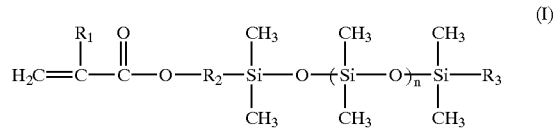

in which $R_1$ stands for hydrogen or methyl,
$R_2$ stands for $C_1$–$C_{10}$ alkylene,
$R_3$ stands for $C_1$–$C_4$ alkyl, and
n stands for an integer of 5–100,
with
50–98% by weight, preferably 65–95% by weight, of an acrylic acid ester or methacrylic acid ester as monomer (B) of the following general formula (II):

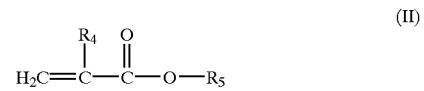

in which $R_4$ stands for hydrogen or methyl, and
$R_5$ stands for $C_1$–$C_{12}$ alkyl
and/or an acrylic acid ester or methacrylic acid ester as monomer (C) of the following general formula (II)

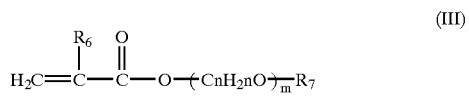

in which $R_6$ stands for hydrogen or methyl,
$R_7$ stands for hydrogen or $C_1$–$C_{18}$ alkyl,
n stands for an integer of 2–4, and
m stands for an integer of 1–50.

We have also discovered that the object of the present invention could equally be accomplished by blending a flow-and-leveling agent with paints, said agent comprising a copolymer having a number-average molecular weight of 1,000–60,000, preferably 2,000–30,000, which is formed by copolymerizing with said monomer (A) and monomer (B) and/or monomer (C), still another monomer (D), which has a polymerizable double bond and is copolymerizable with said monomers, of an amount not exceeding 50% by weight based on the total weight of said monomers (A) and (B) and/or (C).

Where the amount of monomer (A) is less than 2% by weight, sufficient anti-rupture effect cannot be recognized. Whereas, when it exceeds 50% by weight, re-coating property of the paint is adversely affected.

Those specific (meth)acrylic acid esters [monomer (B) and/or monomer (C)] are used as the copolymerizing components in an amount of 50–98% by weight, for securing favorable flow-and-leveling property. Use of monomers other than those cannot impart sufficient flow-and-leveling property to the paints. When the degree of polymerization (m) of the polyalkylene glycol as monomer (C) exceeds 50, not only satisfactory flow-and-leveling property cannot be expected, but also physical properties of painted films are liable to be adversely affected. Where monomers (B) and (C) are concurrently used, their quantitative ratio is optional, so long as their sum falls within the range of 50–98% by weight of the copolymer.

Those copolymers formed of monomer (A) and monomer (B) and/or monomer (C) and monomer (D) can impart good flow-and-leveling property and anti-rupture property, similarly to said two- or three-component copolymers, so long as the use ratio of the monomer (D) is within the specified ratio.

Where the number-average molecular weight of the copolymer is less than 1,000 or more than 60,000, sufficient flow-and-leveling property cannot be obtained by blending it with paints, because its orientability on the painted surfaces at the coating time is insufficient.

Examples of said silicone oil (monomer A) represented by the general formula (I), which has an acryloyloxy group or a methacryloyloxy group include reactive silicones having methacryloyloxy groups (Silaplane™ FM-0711, FM-0721 and FM-0725, Chisso Corporation; AK-5 and AK-30, Toagosei Co., Ltd.).

Examples of (meth)acrylic acid esters (monomer B) represented by the general formula (II) include: methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-octyl (meth)acrylate, 2-ethylhexyl (meth)acrylate, isononyl (meth)acrylate and lauryl (meth)acrylate.

Examples of said (meth)acrylic acid esters (monomer C) represented by the general formula (III) include: 2-methoxyethyl (meth)acrylate, 2-ethoxyethyl (meth)acrylate, 2-butoxyethyl (meth)acrylate, 2-octoxyethyl (meth)acrylate, 2-lauroxyethyl (meth)acrylate, 3-methoxybutyl (meth)acrylate, 4-methoxybutyl (meth)acrylate, ethylcarbitol (meth)acrylate, methoxypolyethylene glycol (meth)acrylate (in which the degree of polymerization of ethylene glycol is 2–50), methoxypolypropylene glycol (meth)acrylate (in which the degree of polymerization of propylene glycol is 2–50), methoxy-poly (ethylene-propylene) glycol (meth)acrylate (in which the degree of polymerization of ethylene glycol-propylene glycol is 2–50), methoxy-poly (ethylene-tetramethylene) glycol (meth)acrylate (in which the degree of polymerization of ethylene glycol-tetramethylene glycol is 2–50), butoxy-poly (ethylene-propylene) glycol (meth)acrylate (in which the degree of polymerization of ethylene glycol-propylene glycol is 2–50), octoxy-poly (ethylene-propylene) glycol (meth)acrylate (in which the degree of polymerization of ethylene glycol-propylene glycol is 2–50), and lauroxy-polyethylene glycol (meth)acrylate (in which the degree of polymerization of ethylene glycol is 2–50).

A copolymer according to the present invention may contain up to 50% by weight, based on the total weight of those segments composed of the monomers A, B and/or C, of monomer D segments. Said monomer D is subject to no limitation, examples of which include (meth)acrylic acid; (meth)acrylic acid esters other than the monomers (B) and (C), such as stearyl (meth)acrylate, cyclohexyl (meth)acrylate, benzyl (meth)acrylate and phenoxyethyl (meth)acrylate; acrylamides such as acrylamide, N,N-dimethylacrylamide, N,N-diethylacrylamide, N-isopropylacrylamide, diacetoneacrylamide and acroylmorpholine; aromatic vinyl compounds such as styrene, α-methylstyrene, chlorostyrene and vinyltoluene; vinyl esters such as vinyl acetate and vinyl propionate; allyl compounds such as diallyl phthalate; vinyl ethers such as ethyl vinyl ether, n-propyl vinyl ether, iso-propyl vinyl ether, n-butyl vinyl ether, iso-butyl vinyl ether, tert-butyl vinyl ether, n-octyl vinyl ether, 2-ethylhexyl vinyl ether, 2-hydroxyethyl vinyl ether, methyl vinyl ether and cyclohexyl vinyl ether; and other vinyl compounds such as vinyl chloride, vinylidene chloride, chloroprene, propylene, butadiene, isoprene and fluoroolefin maleimide.

As the method for synthesizing the copolymers, for example, emulsion polymerization, suspension polymerization, solution polymerization and block polymerization may be named, and as initiators for the polymerization, commonly used azo polymerization initiators or peroxides are useful. The present invention concerns a function of the copolymers, and is free of any limitation incurred by methods of synthesizing the copolymers.

Paints and inks to which the flow-and-leveling agent of the present invention can be suitably added are those to which high quality appearance is required and hence ruptures caused by foreign dust therein creates problems. For example, top coating paints for automobiles comprising acid catalyst-curing type acrylic melamine paints, acid-epoxy curing type acrylic paints and baked finish-type polyester melamine paints; paints for high-quality finished appearance composed chiefly of household appliance PCM; paints for automobile repairing or high class household furnitures, using ambient temperature-drying paints such as fluorine-containing resin paints, acrylic urethane paints and polyester urethane paints. Those paints come to exhibit anti-rupture property, i.e., resistance to ruptures caused by foreign dust, as well as flow-and-leveling property, upon being blended with the flow-and-leveling agent according to the present invention.

The time for addition of the flow-and-leveling agent of the present invention to paints or inks is optional. It may be added in the grinding process, or to finished paints or inks.

The use rate of the flow-and-leveling agent is variable depending on the kind or type of individual paints and inks, composition of pigment formulations and the like. Whereas, normally it is 0.01–5% by weight, preferably 0.5–2% by weight, to the vehicle, as converted to solid.

Where the use rate is less than 0.01% by weight, preventive effect of ruptures caused by foreign dust is not achieved and flow-and-leveling property cannot be sufficiently exhibited. On the other hand, when more than 5% by weight is added, liability to adversely affect defoaming property or to impair re-coating performance increases.

EFFECT OF THE INVENTION

The flow-and-leveling agent for paints and inks according to the invention can effectively prevent deterioration in appearance of painted or printed surfaces attributable to ruptures caused by foreign dust and at the same time impart flow-and-leveling property to the painted or printed surfaces.

EXAMPLES

Hereinafter the invention is explained in further details, referring to Examples in which parts and percentages are by weight.

Production Example 1

A 1000 ml-reaction vessel equipped with a stirrer, reflux condenser, dropping funnel, thermometer and gaseous nitrogen inlet port was charged with 150 parts of butyl acetate, which was heated to 126° C. under introduction of gaseous nitrogen. Thereafter the following solution (a-1) was dropped into said butyl acetate at a constant rate through the dropping funnel consuming 2 hours.

| Solution (a-1) | |
|---|---|
| Ethyl methacrylate | 150 parts |
| 2-Ethoxyethyl acrylate | 75 parts |
| Silaplane ™ FM-0711*[1)] | 75 parts |
| Butyl acetate | 150 parts |
| t-Butylperoxy-2-ethylhexanoate | 7.5 parts |

*[1)]a methacryloyloxy group-containing silicone macromonomer [number-average molecular weight: 1,000 (n = 10)], Chisso Corporation An hour after completion of the dropwise addition of the solution (a-1), 3 parts of t-butylperoxy-2-ethylhexanoate was added to the reaction system, which was allowed to react for subsequent 2 hours while its temperature was maintained at 126° C. After termination of the reaction, the solid content was adjusted to 20% using butyl acetate, to provide an additive [A-1]. The synthesized acrylic copolymer had a number-average molecular weight of 6,000 as converted to polystyrene, which was determined by gel permeation chromatography.

Production Example 2

An additive [A-2] was prepared in the identical manner with Production Example 1, except that the solution (a-1) was replaced with the following solution (a-2).

| Solution (a-2) | |
|---|---|
| Methoxy-polyethylene glycol methacrylate (added mole number = 4) | 150 parts |
| Ethyl acrylate | 75 parts |
| Silaplane FM-0711 | 75 parts |
| Butyl acetate | 50 parts |
| t-Butylperoxy-2-ethylhexanoate | 3 parts |

The number-average molecular weight of the synthesized acrylic copolymer was 12,000.

Production Example 3

An additive [A-3] was prepared in the identical manner with Production Example 1, except that the solution (a-1) was replaced with the following solution (a-3).

| Solution (a-3) | |
|---|---|
| 2-Ethoxyethyl acrylate | 120 parts |
| Isobutyl vinyl ether | 30 parts |
| Silaplane FM-0711 | 50 parts |
| Butyl acetate | 150 parts |
| t-Butylperoxy-2-ethylhexanoate | 10 parts |

The number-average molecular weight of the synthesized acrylic/vinyl ether copolymer was 3,500.

Production Example 4

An additive [A-4] was prepared in the identical manner with Production Example 1, except that the solution (a-1) was replaced with the following solution (a-4).

| Solution (a-4) | |
|---|---|
| Octoxy-polyethylene glycol-polypropylene glycol acrylate (added mole number of ethylene glycol = 8: added mole number of propylene glycol = 6) | 110 parts |
| 2-Ethylhexyl acrylate | 40 parts |
| Silaplane FM-0711 | 50 parts |
| Butyl acetate | 150 parts |
| t-Butylperoxy-2-ethylhexanoate | 4 parts |

The number-average molecular weight of the synthesized acrylic copolymer was 8,000.

Production Example 5

An additive [A-5] was prepared in the identical manner with Production Example 1, except that the solution (a-1) was replaced with the following solution (a-5).

| Solution (a-5) | |
|---|---|
| 2-Methoxyethyl methacrylate | 150 parts |
| Butyl methacrylate | 60 parts |
| Silaplane FM-0721*[2)] | 45 parts |
| Styrene | 45 parts |
| Butyl acetate | 50 parts |
| t-Butylperoxy-2-ethylhexanoate | 1 part |

*[2)]a methacryloyloxy group-containing silicone macromonomer [number-average molecular weight: 5,000 (n = 50)] Chisso Corporation The number-average molecular weight of the synthesized acrylic/styrene copolymer was 45,000.

Production Example 6

An additive [A-6] was prepared in the identical manner with Production Example 1, except that the solution (a-1) was replaced with the following solution (a-6).

| Solution (a-6) | |
|---|---|
| Ethyl methacrylate | 150 parts |
| 2-Ethoxyethyl acrylate | 135 parts |
| Silaplane FM-0711 | 15 parts |
| Butyl acetate | 150 parts |
| t-Butylperoxy-2-ethylhexanoate | 7.5 parts |

The number-average molecular weight of the synthesized acrylic copolymer was 6,000.

Production Example 7

An additive [A-7] was prepared in the identical manner with Production Example 1, except that the solution (a-1) was replaced with the following solution (a-7).

| Solution (a-7) | |
|---|---|
| 2-Ethoxyethyl acrylate | 155 parts |
| Silaplane FM-0711 | 145 parts |
| Butyl acetate | 150 parts |
| t-Butylperoxy-2-ethylhexanoate | 7.5 parts |

The number-average molecular weight of the synthesized acrylic copolymer was 6,000.

Comparative Production Example 1

An additive [N-1] was prepared in the identical manner with Production Example 1, except that the solution (a-1) was replaced with the following solution (n-1).

| Solution (n-1) | |
|---|---|
| Ethyl methacrylate | 150 parts |
| 2-Ethoxyethyl acrylate | 145 parts |
| Silaplane FM-0711 | 5 parts |
| Butyl acetate | 150 parts |
| t-Butylperoxy-2-ethylhexanoate | 7.5 parts |

The number-average molecular weight of the synthesized acrylic copolymer was 6,000.

Comparative Production Example 2

An additive [N-2] was prepared in the identical manner with Production Example 1, except that the solution (a-1) was replaced with the following solution (n-2).

| Solution (n-2) | |
|---|---|
| Ethyl methacrylate | 70 parts |
| 2-Ethoxyethyl acrylate | 70 parts |
| Silaplane FM-0711 | 160 parts |
| Butyl acetate | 150 parts |
| t-Butylperoxy-2-ethylhexanoate | 7.5 parts |

The number-average molecular weight of the synthesized acrylic copolymer was 6,000.

Comparative Production Example 3

An additive [N-3] was prepared in the identical manner with Production Example 1, except that the solution (a-1) was replaced with the following solution (n-3).

| Solution (n-3) | |
|---|---|
| Ethyl methacrylate | 80 parts |
| 2-Ethoxyethyl acrylate | 35 parts |
| Silaplane FM-0711 | 35 parts |
| Butyl acetate | 300 parts |
| t-Butylperoxy-2-ethylhexanoate | 15 parts |

The number-average molecular weight of the synthesized acrylic copolymer was 800.

Comparative Production Example 4

An additive [N-4] was prepared in the identical manner with Production Example 1, except that the solution (a-1) was replaced with the following solution (n-4) and the reaction temperature of 85° C. was adopted.

| Solution (n-4) | |
|---|---|
| Ethyl methacrylate | 150 parts |
| 2-Ethoxyethyl acrylate | 75 parts |

| -continued | |
|---|---|
| Solution (n-4) | |
| Silaplane FM-0711 | 75 parts |
| t-Butylperoxy-2-ethylhexanoate | 0.3 parts |

The number-average molecular weight of the synthesized acrylic copolymer was 76,000.

Comparative Production Example 5

As a flow-and-leveling agent, L-1984–50 (Kusumoto Chemicals, Ltd.) was mixed with a silicone flow-and-leveling agent, KF-69 (dimethylsilicone oil: Shin-Etsu Silicone Chemical Co., Ltd.), at a ratio in terms of solid of 75:25. The content of the non-volatile component in the mixture was adjusted to 20% with toluene, to provide an additive [N-5].

TABLE 1

Acrylic Acid Ester Polymers Formed in the Production Examples

| | Additive | Number-average Molecular Weight | Non-volatile Component (%) |
|---|---|---|---|
| Production Example 1 | A-1 | 6000 | 20 |
| Production Example 2 | A-2 | 12000 | 20 |
| Production Example 3 | A-3 | 3500 | 20 |
| Production Example 4 | A-4 | 8000 | 20 |
| Production Example 5 | A-5 | 45000 | 20 |
| Production Example 6 | A-6 | 6000 | 20 |
| Production Example 7 | A-7 | 6000 | 20 |

TABLE 2

Comparative Production Examples

| | Additive | Number-average Molecular Weight | Non-volatile Component (%) |
|---|---|---|---|
| Comparative Production Example 1 | N-1 | 6000 | 20 |
| Comparative Production Example 2 | N-2 | 6000 | 20 |
| Comparative Production Example 3 | N-3 | 800 | 20 |
| Comparative Production Example 4 | N-4 | 76000 | 20 |
| Comparative Production Example 5 | N-5 (L-1984-50/ KF-69) | 5500 | 20 |

Paint Test Examples

Test results of those flow-and-leveling agents as formed in the production Examples were as follows.

Those additives' performance test in respect of flow-and-leveling property and mist-prevention (anti-rupture property) were conducted as to acrylic resin/melamine-curing type paint formulations of the composition as shown in Tables 4 and 6.

First, paint formulations of the compositions as shown in Tables 3–6 were prepared. Then to the top coating clear paints of Table 4 and the top coating solid paints of Table 6, the additives A-1 to A-7 of Table 1 and the additives N-1 to N-5 of Table 2 were added and dispersed for 1 minute with a laboratory dissolver at 2,000 rpm.

Evaluation Example 1 (Anti-rupture Test with Foreign Dust)

Viscosity of an inter-coating paint of the composition as shown in Table 5 was adjusted to 18 seconds with Ford Cup #4. The paint was spray-applied onto tin plates (200 mm×300 mm each in size) and baked at 140° C. for 20 minutes to provide the inter-coat-applied plates. After cooling the baked plates to room temperature, various foreign dust materials were deposited on the baked paint surfaces.

Thereafter the top coating solid paints containing the various flow-and-leveling agents as added thereinto were applied to the foreign dust material-applied inter-coated plates by means of air spraying, to inclined paint film thickness from 10 μm to 50 μm. Allowing the plates to stand for 5 minutes at room temperature, they were baked in a 140° C. oven for 20 minutes, and the condition of ruptures caused by the foreign dust was observed and the flow-and-leveling property was evaluated.

The evaluation of the baked films was conducted in the following manner. As for the ruptures caused by the foreign dust, thickness of the film spots at which ruptures were formed and condition of the ruptures were observed and evaluated in 5 grades from "the best" (5) to "the worst" (1). Also evaluation of the flow-and-leveling property of the painted films was done by visual observation of flow-and-leveling property and sharpness of the baked film surfaces in collation to five-stages standard panels from the worst to the best. The results were as shown in Table 8.

Evaluation Example 2 (Evaluation of Re-coating Property)

Viscosity of the metallic base paint (MBP) of Table 3 was adjusted to 13 seconds with Ford Cup #4, using a diluting solvent, and the paint was applied onto the inter-coated plates by means of air spraying, to a dry paint film thickness of 15 μm. After drying the painted films for 5 minutes at room temperature, the top coating clear paint of Table 4 into which the additives as test specimens had been incorporated was applied thereto to a film thickness of 30 μm, followed by 5 minutes' standing at room temperature and baking in a 160° C. oven for 20 minutes. After cooling the baked samples down to room temperature, isopropyl alcohol was dropped on the baked film surfaces and allowed to dry spontaneously. On the baked films after the drying, the additives gathered in concentrated condition. Onto those films a metallic base coating paint and a top coat clear paint were air-sprayed by the same procedures as above-described, and baked in a 120° C. oven for 20 minutes. Cooling the baked samples off to room temperature, the color change in the base coating on the areas to which the additives had gathered, and flow-and-leveling property were evaluated. Furthermore, re-coating adhesion was evaluated by cross-cut test.

The evaluations were given in the following manner. The color change caused by the isopropyl alcohol (IPA resistance) and flow-and-leveling property were visually graded in five scales from the best (5) to the worst (1). Re-coating adherability test was conducted by forming 100 checkers by cutting and dividing a 10 mm×10 mm area of each baked film at 1 mm intervals lengthwise and breadthwise, and conducting a peel test using cellophane adhesive tape. The numbers of checkers remaining unpeeled were counted. The test results were as shown in Table 9.

TABLE 3

Metallic Base Paint Formulation

| Ingredient | Amount (part) | Maker company |
|---|---|---|
| Acrydic ™ A-405 | 60.0 | Dainippon Ink & Chemicals, Inc. |
| Super Beckamine ™ L-117-60 | 20.0 | Dainippon Ink & Chemicals, Inc. |
| Alpaste ™ 7620NS | 8.0 | Toyo Aluminium K.K. |
| Xylene | 21.4 | |
| Disparlon ™ 6900-20X | 3.0 | Kusumoto Chemicals, Ltd. |
| Diluting solvent*⁾ | 50.6 | |

*⁾diluting solvent: toluene/ethyl acetate/Solvesso #100/isobutyl alcohol = 50/20/20/10

TABLE 4

Top Coating Clear Paint Formulation

| Ingredient | Amount (part) | Maker company |
|---|---|---|
| Johncryl ™ 500 | 203.6 | Johnson Polymer K.K. |
| Cymel ™ 325 | 69.7 | Mitsui Cytec, Ltd. |
| Nacure ™ 5528 | 0.88 | King Industries, Inc. |
| Diluting solvent*⁾ | 97.7 | |
| Disparlon ™ AP-10 (defoamer) | 1.75 | Kusumoto Chemicals, Ltd. |

*⁾diluting solvent: Solvesso #100/methyl isobutyl ketone/butyl alcohol = 30/30/40

TABLE 5

Intercoating Paint Formulation

| Ingredient | Amount (part) | Maker company |
|---|---|---|
| Beckosol ™ EY-3002-65 | 15.0 | Dainippon Ink & Chemicals, Inc. |
| Beckosol ™ 57-1362 | 30.0 | Dainippon Ink & Chemicals, Inc. |
| Titanium Dioxide CR-93 | 35.0 | Ishihara Sangyo Kaisha, Ltd. |
| Super Beckamine ™ G-821-60 | 20.0 | Dainippon Ink & Chemicals, Inc. |
| Diluting solvent*⁾ | 65.0 | |
| Disparlon ™ L-1984-50 (flow-and-leveling agent) | 0.45 | Kusumoto Chemicals, Ltd. |
| Disparlon ™ AP-10 (defoamer) | 0.45 | Kusumoto Chemicals, Ltd. |

*⁾diluting solvent: Solvesso #100/xylene/butyl cellosolve/butyl alcohol = 40/30/20/10

TABLE 6

Top Coating Solid Paint Formulation

| Ingredient | Amount (part) | Maker company |
|---|---|---|
| Cargill ™ 5770 | 42.0 | McWhorter Co. |
| Cymel ™ 303 | 11.9 | Mitsui Cytec, Ltd. |
| Titanium Dioxide CR-90 | 38.1 | Ishihara Sangyo Kaisha, Ltd. |
| Nacure ™ 5528 | 0.6 | King Industries, Inc. |
| Diluting solvent*⁾ | 16.2 | |
| Disparlon ™ AP-30 (defoamer) | 1.1 | Kusumoto Chemicals, Ltd. |

*⁾diluting solvent: methyl ethyl ketone/butyl cellosolve/butyl alcohol = 29/34/16

TABLE 7

Foreign Dust For Rupture Test

| No. | Component |
|---|---|
| A | Machine oil D (xylene solution) |
| B | Oil for vacuum pump*[1] (xylene solution) |
| C | Silicone oil*[2] (xylene solution) |
| D | Hand cream*[3] (toluene/IPA solution) |
| E | Fingerprints*[4] |

*[1]NOVAC ™ MR-200 (Matsumura Oil Co., Ltd.)
*[2]SH-200 500 cSt (Dow Corning Toray Silicone Co., Ltd.)
*[3]Atrix Medical Use (Nivea-Kao Co., Ltd.)
*[4]fingerprints left on the test panel by pressing the panel surface directly with fingers

TABLE 8

Result of Repture Test Using Foreign Dust (solid paint)

| Sample | Amount (%) | Foreign Dust A | B | C | D | E | Flow-and-leveling Property |
|---|---|---|---|---|---|---|---|
| BLANK | — | 1 | 1 | 1 | 1 | 1 | 1 |
| A-1 | 0.5 | 5 | 5 | 5 | 5 | 5 | 5 |
| A-2 | 0.5 | 5 | 5 | 5 | 5 | 5 | 5 |
| A-3 | 0.5 | 5 | 5 | 5 | 5 | 5 | 5 |
| A-4 | 0.5 | 5 | 5 | 5 | 5 | 5 | 4 |
| A-5 | 0.5 | 3 | 3 | 5 | 3 | 5 | 3 |
| A-6 | 0.5 | 3 | 3 | 2 | 4 | 4 | 5 |
| A-7 | 0.5 | 5 | 5 | 5 | 5 | 5 | 2 |
| N-1 | 0.5 | 3 | 2 | 1 | 2 | 3 | 3 |
| N-2 | 0.5 | 5 | 5 | 5 | 5 | 5 | 1 |
| N-3 | 0.5 | 1 | 1 | 2 | 2 | 3 | 2 |
| N-4 | 0.5 | 3 | 3 | 3 | 4 | 5 | 1 |
| N-5 | 0.5 | 2 | 2 | 5 | 5 | 5 | 1 |

TABLE 9

Test Result of Clear Baked Paint

| Sample | Amount (%) | IPA Resistance | Flow-and-leveling Property | Interlayer Adherability (cross-cut test) |
|---|---|---|---|---|
| BLANK | — | 5 | 1 | 75/100 |
| A-1 | 0.25 | 4 | 5 | 100/100 |
| A-2 | 0.25 | 4 | 4 | 100/100 |
| A-3 | 0.25 | 4 | 5 | 100/100 |
| A-4 | 0.25 | 4 | 5 | 100/100 |
| A-5 | 0.25 | 3 | 3 | 100/100 |
| A-6 | 0.25 | 5 | 5 | 100/100 |
| A-7 | 0.25 | 2 | 3 | 100/100 |
| N-1 | 0.25 | 5 | 2 | 100/100 |
| N-2 | 0.25 | 1 | 1 | 75/100 |
| N-3 | 0.25 | 1 | 2 | 100/100 |
| N-4 | 0.25 | 4 | 1 | 50/100 |
| N-5 | 0.25 | 1 | 3 | 0/100 |

What is claimed is:

1. A method for imparting flow-and-leveling properties to inks and paints, comprising the step of:
adding a copolymer having a number-average molecular weight of from 1,000 to 60,000 which is obtained by copolymerizing 2–50% by weight of monomer (A) silicone oil having acryloyloxy group or methacryloyloxy group, represented by a general formula (I)

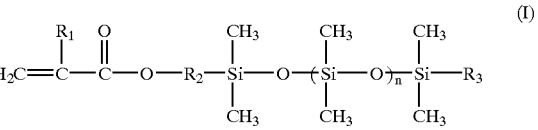

in which $R_1$ stands for hydrogen or methyl, $R_2$ stands for $C_1$–$C_{10}$ alkylene, $R_3$ stand for $C_1$–$C_4$ alkyl, and n stands for an integer of 5–100
with 50–98% by weight of monomer (B) an acrylic acid ester or methacrylic acid ester represented by a general formula (II)

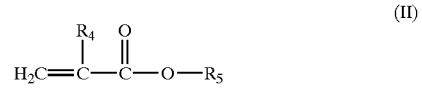

in which $R_4$ stands for hydrogen or methyl, and $R_5$ stands for $C_1$–$C_{12}$ alkyl
and/or monomer (C) an acrylic acid ester or methacrylic acid ester represented by a general formula (III)

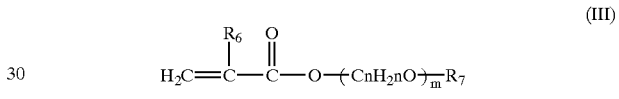

in which $R_6$ stands for hydrogen or methyl, $R_7$ stands for hydrogen or $C_1$–$C_{18}$ alkyl, n stands for an integer of 2–4 and m stands for an integer of 1–50 to inks and paints.

2. The method for imparting flow-and-leveling properties to inks and paints according to claim 1, in which the copolymer is composed of 5–35% by weight of monomer (A) and 65–95% by weight of monomer (B) and/or monomer (C).

3. A The method for imparting flow-and-leveling properties to inks and paints according to claim 1, in which the copolymer has a number-average molecular weight of 2,000–30,000.

4. A method for imparting flow-and-leveling properties to inks and paints comprising the step of:
adding a copolymer having a number-average molecular weight of from 1,000 to 60,000, which is obtained by copolymerizing, together with the monomers (A) and (B) and/or (C) as defined in claim 1, other monomer (D) having polymerizable double bond and being copolymerizable with said monomers; in an amount not exceeding 50% by weight of the total weight of said monomers (A) and (B) and/or (C) to inks and paints.

5. The method for imparting flow-and-leveling properties to inks and paints according to claim 4, in which the copolymer has a number-average molecular weight of 2,000–30,000.

* * * * *